United States Patent
Gulley

(10) Patent No.: US 8,605,109 B1
(45) Date of Patent: Dec. 10, 2013

(54) TREND DENSITY PLOT

(75) Inventor: Edward Whittington Gulley, Watertown, MA (US)

(73) Assignee: The Mathworks, Inc., Natick, MA (US)

(*) Notice: Subject to any disclaimer, the term of this patent is extended or adjusted under 35 U.S.C. 154(b) by 146 days.

(21) Appl. No.: 13/294,710

(22) Filed: Nov. 11, 2011

(51) Int. Cl.
*G09G 5/02* (2006.01)

(52) U.S. Cl.
USPC ............................................. 345/589

(58) Field of Classification Search
USPC ............................................. 345/589
See application file for complete search history.

(56) References Cited

U.S. PATENT DOCUMENTS

| | | | |
|---|---|---|---|
| 7,460,123 B1* | 12/2008 | Hull | 345/440 |
| 2008/0137961 A1* | 6/2008 | Ishida et al. | 382/197 |
| 2010/0275263 A1* | 10/2010 | Bennett et al. | 726/25 |

\* cited by examiner

*Primary Examiner* — Aaron M Richer
*Assistant Examiner* — Vu Nguyen
(74) *Attorney, Agent, or Firm* — Harrity & Harrity, LLP

(57) ABSTRACT

In an embodiment, a first data series and a second data series may be acquired. A first boundary may be established based on the first data series. The second boundary may be established on the second data series. A first region with respect to the first boundary may be identified. A second region with respect to the second boundary may be identified. A first scale may be associated with the first region and a second scale may be associated with the second region. A depiction of the first data series and the second data series may be rendered the depiction may include an indication of one or more of the first boundary, the second boundary, the first region, the second region, the first scale, or the second scale.

20 Claims, 12 Drawing Sheets
(2 of 12 Drawing Sheet(s) Filed in Color)

TREND DENSITY PLOT

BRIEF DESCRIPTION OF THE DRAWINGS

The patent or application file contains at least one drawing executed in color. Copies of this patent or patent application publication with color drawing(s) will be provided by the Office upon request and payment of the necessary fee. The accompanying drawings, which are incorporated in and constitute a part of this specification, illustrate one or more embodiments described herein and, together with the description, explain these embodiments. In the drawings.

The patent or application file contains at least one drawing executed in color. Copies of this patent or patent application publication with color drawing(s) will be provided by the Office upon request and payment of the necessary fee. The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

One or more embodiments of the invention may be implemented on one or more computing devices. The one or more computing devices may be a system or part of a system. The one or more computing devices may include, for example, a desktop computer, laptop computer, client computer, server computer, mainframe computer, personal digital assistant (PDA), netbook computer, tablet computer, web-enabled cellular telephone, smart phone, or some other computing device.

Figure 1:
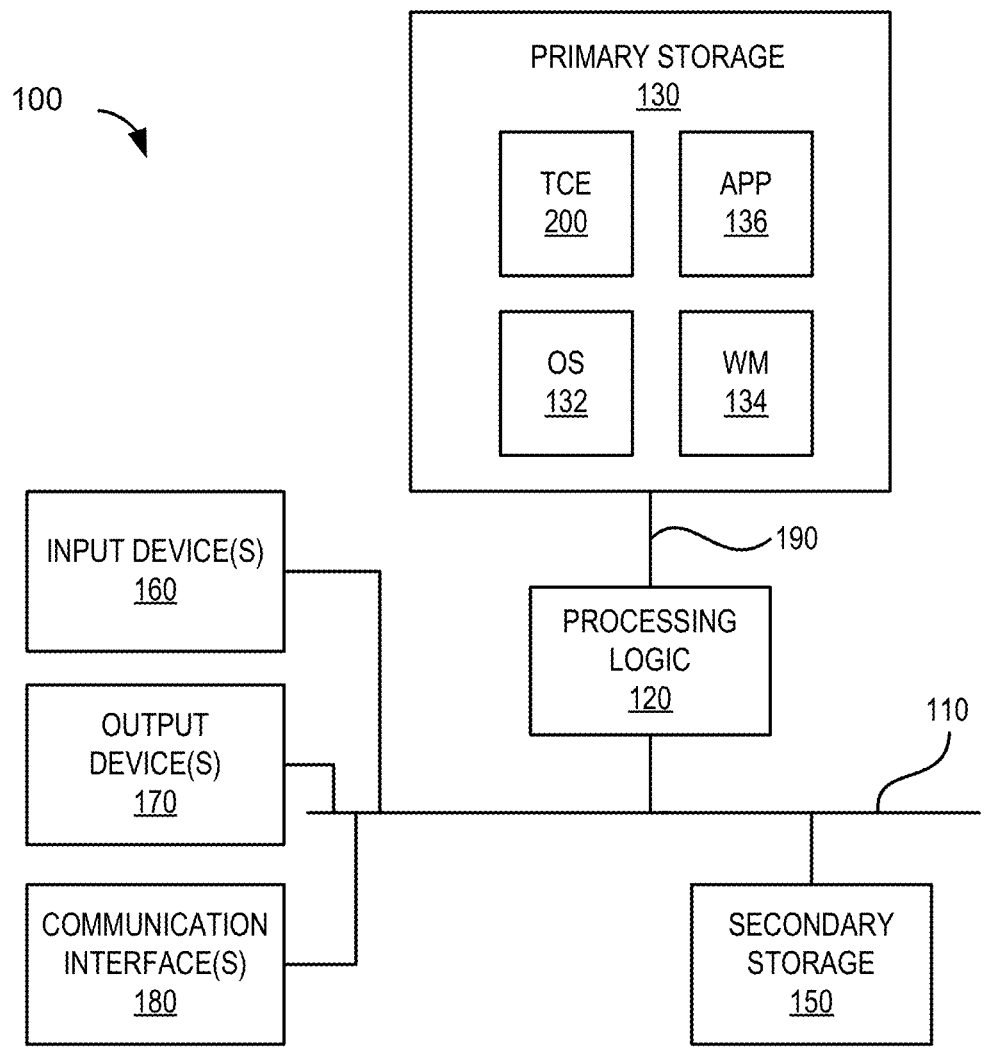
FIG. 1 illustrates a block diagram of an example of a computing device that may implement one or more embodiments of the invention.

FIG. 1 illustrates an example of a computing device 100 that may implement one or more embodiments of the invention. Referring to FIG. 1, the computing device 100 may include one or more components, such as processing logic 120, primary storage 130, secondary storage 150, one or more input devices 160, one or more output devices 170, and one or more communication interfaces 180, that may be connected together by one or more buses, such as input-output (I/O) bus 110 and memory bus 190. It should be noted that computing device 100 is an example of a computing device that may implement one or more embodiments of the invention. Other computing devices that may be less complicated or more complicated than computing device 100 may implement one or more embodiments of the invention.

The I/O bus 110 may be an interconnect bus that may enable communication between various components in the computing device 100, such as processing logic 120, secondary storage 150, input devices 160, output devices 170, and communication interfaces 180. The communication may include, among other things, transferring information (e.g., data, control information, executable instructions) between the components.

The memory bus 190 may be an interconnect bus that may enable information to be transferred between the processing logic 120 and the primary storage 130. The information may include instructions and/or data that may be executed, manipulated, and/or otherwise processed by processing logic 120. The instructions and/or data may include instructions and/or data that may implement one or more embodiments of the invention.

The processing logic 120 may include logic that may interpret, execute, and/or otherwise process information contained in, for example, the primary storage 130 and/or secondary storage 150. The information may include computer-executable instructions and/or data that may implement one or more embodiments of the invention. The processing logic 120 may comprise a variety of hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processing logic 120 may comprise a single core or multiple cores. Moreover, processing logic 120 may comprise a system-on-chip (SoC) or system-in-package (SiP). An example of a processor that may be used to implement processing logic 120 is the Intel® Xeon® processor available from Intel Corporation, Santa Clara, Calif.

The secondary storage 150 may be accessible to the processing logic 120 via I/O bus 110. The secondary storage 150 may store information for the processing logic 120. The information may be executed, interpreted, manipulated, and/or otherwise processed by the processing logic 120. The secondary storage 150 may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device. This media may include, for example, magnetic discs, optical discs, magnetic tape, and/or memory devices (e.g., flash memory devices, memristor devices, static RAM (SRAM) devices, dynamic RAM (DRAM) devices, or other memory devices). The stored information may include data and/or computer-executable instructions that may implement one or more embodiments of the invention.

Input devices 160 may include one or more devices that may be used to input information into computing device 100. Examples of devices that may be used to input information into computing device 100 may include a keyboard (e.g., hardware keyboard, software keyboard), computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, eyeball controlled device, finger mouse, light pen, light gun, neural device, eye tracking device, gesture tracking device, steering wheel, yoke, jog dial, space ball, directional pad, dance pad, soap mouse, haptic device, tactile device, neural device, multipoint input device, discrete pointing device, or some other input device. The information may include spatial (e.g., continuous, multi-dimensional) data that may be input into computing device 100, for example, using a device such as a computer mouse. The information may also include other types of data, such as, for example, text that may be input using a keyboard.

Output devices 170 may include one or more devices that may output information from the computing device 100. Examples of devices that may output information from the computing device 100 may include a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, neural stimulation device, printer (e.g., a three-dimensional (3D) printer, laser printer, inkjet printer), speaker, video projector, volumetric display device, plotter, actuator (e.g., electrical motor), or some other output device.

Output devices 170 may be directed by, for example, the processing logic 120, to output the information from the computing device 100. The information may be presented (e.g., displayed, printed) by output devices 170. The information may include, for example, graphical user interface (GUI) elements (e.g., windows, widgets, dialog boxes, or other GUI elements), graphical representations (e.g., graphs, block diagrams), pictures, text, or other information that may be presented by output devices 170. Note that the information may be presented on output devices 170 in a stereoscopic view to enable, for example, a perception of depth.

Communication interfaces 180 may include one or more devices that contain logic that may (1) interface the computing device 100 with, for example, one or more communication networks and (2) enable the computing device 100 to communicate with one or more devices connected to the communication networks. An example of a communication network that may be used with computing device 100 will be described further below with respect to FIG. 8.

Communication interfaces 180 may include one or more transceiver-like mechanisms that enable the computing device 100 to communicate with devices connected to the communication networks. Communication interfaces 180 may include a built-in network adapter, network interface card (NIC), Personal Computer Memory Card International Association (PCMCIA) network card, card bus network adapter, wireless network adapter, Universal Serial Bus (USB) network adapter, modem, or other device suitable for enabling the computing device 100 to communicate with the communication networks.

The primary storage 130 is accessible to the processing logic 120 via bus 190. The primary storage 130 may be a non-transient tangible computer-readable media that may store information for processing logic 120. The information may include computer-executable instructions and/or data that may implement operating system (OS) 132, windows manager (WM) 134, an application (APP) 136, and/or a technical computing environment (TCE) 200. The instructions may be executed, interpreted, and/or otherwise processed by processing logic 120.

The primary storage 130 may comprise a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

OS 132 may be a conventional operating system that may implement various conventional operating system functions. These functions may include, for example, scheduling one or more portions of APP 136 and/or TCE 200 to run on processing logic 120, managing primary storage 130, controlling access to various components associated with computing device 100 (e.g., secondary storage 150, input devices 160, output devices 170, communication interfaces 180), and controlling access to data received and/or transmitted by these components.

Examples of operating systems that may be used to implement OS 132 include the Linux operating system, Microsoft Windows operating system, the Symbian operating system, Mac OS, Chrome OS, and the Android operating system. A version of the Linux operating system that may be used is Red Hat Linux available from Red Hat Corporation, Raleigh, N.C. Versions of the Microsoft Windows operating system that may be used include Microsoft Windows 7, Microsoft Windows Vista, Microsoft Windows Mobile, and Microsoft Windows XP operating systems available from Microsoft Inc., Redmond, Wash. The Chrome OS and Android operating systems are available from Google, Inc., Mountain View, Calif. The Mac OS operating system is available from Apple Inc., Cupertino, Calif. The Symbian operating system is available from the Symbian Foundation, London, United Kingdom.

WM 134 may be a conventional window manager that may manage one or more GUI elements, such as widgets, dialog boxes, and windows, that may associated with the OS 132, TCE 200, and/or APP 136. The GUI elements may be displayed on an output device 170. The GUI elements may include one or more graphs that may be generated by, for example, APP 132 and/or TCE 200. The graphs may include one or more trend density plots, such as the trend density plots described herein. The WM 134 may also (1) capture one or more positions of interactions with an input device 160 and/or other data associated with the input device 160, and (2) provide the positions and/or data to, for example, OS 132, APP 136, and/or TCE 200. The positions and/or data may be provided in messages that are sent to the OS 132, APP 136, and/or TCE 200.

Examples of window managers that may be used to implement WM 134 may include X windows, GNOME, Unity, and KDE, which are often used with the Linux operating system, and window managers used with the Microsoft Windows XP, Microsoft Windows Vista, Microsoft Windows Phone, and Microsoft Windows 7 operating systems. It should be noted that other window managers or components that implement various functions associated with window managers may be used to implement WM 134.

APP 136 may be designed to perform a particular task or tasks. APP 136 may be an executable and/or interpretable version of a software application that may be written in one or more programming languages. The programming languages may include, for example, C, C++, JAVA®, MATLAB® language, C#, or some other programming language. Some or all of APP 136 may be written by a user of computing device 100, supplied by a vendor, and/or generated by TCE 200. Some or all of APP 136 may operate (e.g., execute) under the control of OS 132 and/or TCE 200. APP 136 may include computer-executable instructions and/or data that may implement one or more embodiments of the invention.

TCE 200 may provide a computing environment that may allow, for example, a user to perform tasks related to disciplines, such as, but not limited to, mathematics, science, engineering, medicine, business, biology, and finance. TCE 200 may use an array as a basic element, where the array may not require dimensioning. The arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations.

TCE 200 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based programming language, includes the following statements:

A=[1, 2]
A=[1.1, 2.2, 3.3]

Now suppose the program is executed, for example, in a TCE, such as TCE 200. During run-time, when the statement "A= [1, 2]" is executed the data type of variable "A" may be a 1-by-2 array containing elements whose data type are integer. Later, when the statement "A=[1.1, 2.2, 3.3]" is executed, since the language is dynamically typed, the data type of variable "A" may be changed from the above 1-by-2 array to a 1-by-3 array containing elements whose data type are floating point. As can be seen by this example, data in a program written in a dynamically typed array-based computing language may be contained in an array. Moreover, the data type of the data may be determined during execution of the program. Thus, in a dynamically typed array-based computing language, data may be represented by arrays and data types of data may be determined at run-time.

TCE 200 may perform matrix and/or vector formulations that may be used for data analysis, data visualization, application development, simulation, modeling, and/or algorithm development. These matrix and/or vector formulations may be used in many areas, such as statistics, image processing, signal processing, control design, life sciences modeling, financial modeling, discrete event analysis and/or design, and state-based analysis and/or design.

TCE 200 may provide mathematical functions and/or graphical tools that may be used for creating plots, surfaces, images, volumetric representations, or other representations. TCE 200 may provide these functions and/or tools using toolboxes (e.g., toolboxes for signal processing, image processing, data plotting, parallel processing). In addition, TCE 200 may provide these functions as block sets. TCE 200 may also provide these functions in other ways, such as, for example, via a library, local or remote database, remote procedure calls (RPCs), and/or an application programming interface (API).

Figure 2:
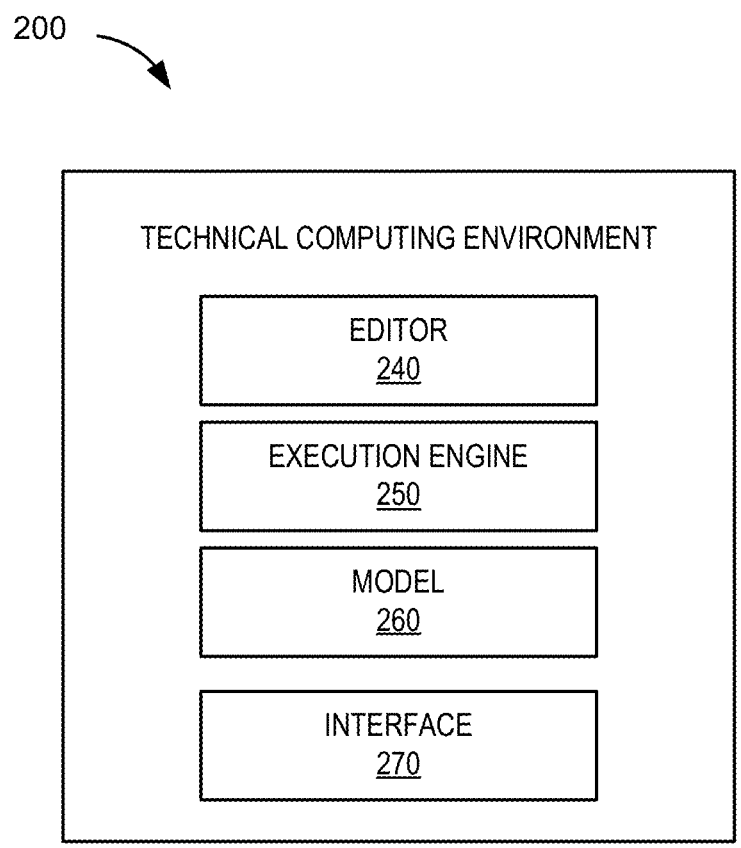
FIG. 2 illustrates a block diagram of an example of a technical computing environment (TCE) that may implement one or more embodiments of the invention.

FIG. 2 illustrates an example embodiment of TCE 200. Referring to FIG. 2, TCE 200 may comprise various components, which may include an editor 240, an execution engine 250, a model 260, and an interface 270. Note that FIG. 2 illustrates an example embodiment of TCE 200. Other embodiments of TCE 200 may contain, for example, more components or fewer components than the components illustrated in FIG. 2. Moreover, in other embodiments of TCE 200, functions performed by the various components contained in TCE 200 may be distributed among the components differently, than described herein.

Examples of TCEs that may implement one or more embodiments of the invention may include, but are not limited to, MATLAB®, Simulink®, Stateflow®, Simscape™, SimMechanics™, and SimEvents®, which are available from The MathWorks, Inc.; Unified Modeling Language (UML); profiles associated with UML (e.g., Modeling Analysis and Real-Time Embedded Systems (MARTE), Systems Modeling Language (SysML), Avionics Architecture Description Language (AADL)); GNU Octave from the GNU Project; MATRIXx and LabView® from National Instruments; Mathematica from Wolfram Research, Inc.; Mathcad from Mathsoft Engineering & Education Inc.; Maple from Maplesoft; Extend from Imagine That, Inc.; Scilab and Scicos from The French Institution for Research in Computer Science and Control (INRIA); Modelica and Dymola from Dynasim AB; VisSim from Visual Solutions; SoftWIRE from Measurement Computing Corporation; WiT from DALSA Coreco; Advanced Design System, VEE Pro, and SystemVue from Agilent Technologies, Inc.; Vision Program Manager from PPT Vision, Inc.; Khoros from Khoral Research, Inc.; VisiQuest from Pegasus Imaging Corporation; Gedae from Gedae, Inc.; Virtuoso from Cadence Design Systems, Inc.; Rational Rose, Rhapsody, and Tau from International Business Machines (IBM), Inc.; SCADE from Esterel Technologies; Working Model 2D from Design Simulation Technologies, Inc.; Working Model from Design Simulation Technologies, Inc.; Computer Aided Three-dimensional Interactive Application (CATIA) and SolidWorks from Dassault Systems; and Ptolemy from the University of California at Berkeley.

Editor 240 may be a block diagram editor that may allow, for example, a user, to specify, edit, annotate, save, publish, and/or print model 260. For example, a block diagram of model 260 may be presented (e.g., displayed) and the editor 240 may contain one or more provisions for specifying, editing, annotating, saving, publishing, and/or printing the block diagram. Note that editor 240 may contain provisions for specifying, editing, annotating, saving, publishing, and/or printing the block diagram graphically and/or textually. In addition, editor 240 may contain one or more provisions for editing code (e.g., source code), requirements, and/or tests that may be generated from or otherwise associated with model 260.

The execution engine 250 may use model 260 to simulate some or all of the system represented by model 260. The simulation may include performing various computations, associated with the system, based on information (e.g., geometry information) associated with one or more modeling elements contained in model 260. The computations may include, but are not limited to, computations of dynamics, statics, equilibrium, mass, inertia, collision detection, collision response, and/or force fields associated with the system.

Model 260 may be, for example, a time-based graphical block diagram model, a state transition diagram, a discrete event model, an activity diagram, a Unified Modeling Language (UML) diagram, a sequence diagram, a data flow model, or some other type of model or diagram. Model 260 may represent a system, such as a physical system. Model 260 may be graphical, textual, or some combination of graphical and textual. The system represented by model 260 may be dynamic, linear, non-linear, or some other type of system.

A dynamic system (either natural or man-made) may be a system whose response at any given time may be a function of its input stimuli, its current state, and a current time. Such systems may range from simple to highly complex systems. Natural dynamic systems may include, for example, a falling body, the rotation of the earth, bio-mechanical systems (muscles, joints, etc.), bio-chemical systems (gene expression, protein pathways), weather, and climate pattern systems. Examples of man-made or engineered dynamic systems may include, for example, a bouncing ball, a spring with a mass tied on an end, automobiles, airplanes, control systems in major appliances, communication networks, audio signal processing systems, and a stock market.

The system represented by model 260 may have various execution semantics that may be represented in model 260 as a collection of modeling elements, often referred to as blocks. A block may generally refer to a portion of functionality that may be used in model 260. The block may be graphically represented, however, it can be appreciated that the block does not necessarily need to be represented graphically. For example, the block may be represented textually or stored in some form of internal representation. Also, a particular visual depiction used to represent the block, for example in a graphical block diagram, may be an arbitrary design choice.

A block may be hierarchical in that the block itself may comprise one or more blocks that make up the block. A block comprising one or more blocks (sub-blocks) may be referred to as a subsystem block. A subsystem block may represent a subsystem of the overall system represented by the model.

Model 260 may contain provisions for outputting a plot of data. For example, model 260 may contain a block (e.g., a scope block) that may output a graph that includes data that is input into the block. The data may be input into the block as one or more data series and the graph may include a plot (e.g., a trend density plot) of some or all of the data contained in the one or more data series.

Interface 270 may enable, for example, commands, data, code, or other information, to be entered into TCE 200. Interface 270 may allow the information to be entered textually and or graphically (e.g., via menus). For example, interface 270 may be a command line interface that may enable one or more data series to be entered by a user. Interface 270 may also enable the user to input one or more commands and/or code that when executed may cause a plot (e.g., a trend density plot) to be generated from the one or more data series and rendered on an output device 170.

Figure 3A:
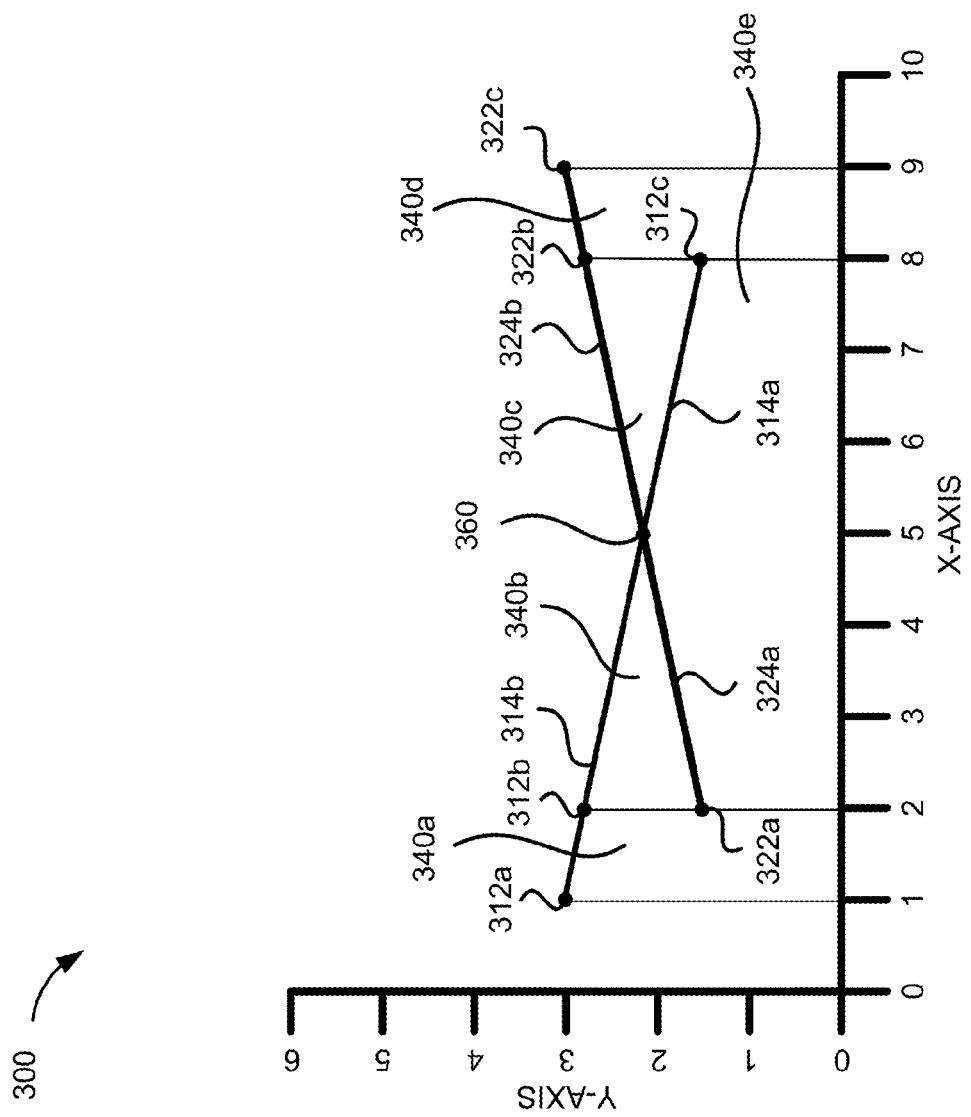
FIGS. 3A-B illustrate example graphs of a first data series and a second data series.
Figure 3B:
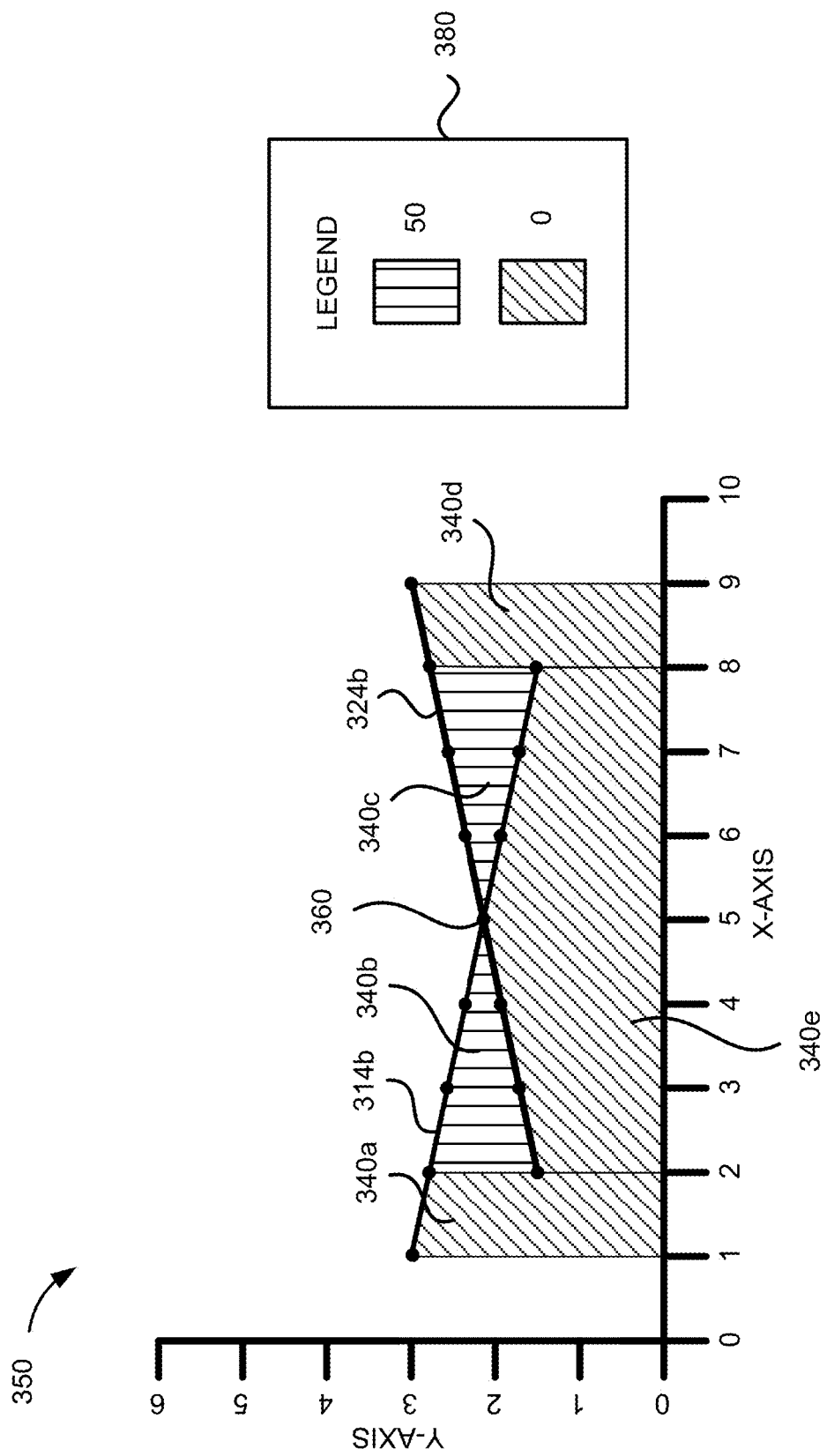

FIGS. 3A-B illustrates an example graph 300 that contains a plot of two data series. The graph 300 may be output from an execution of model 260 or otherwise output by TCE 200 and/or APP 136. The graph 300 may be output on an output device, such as output device 170.

Referring now to FIG. 3A, data in a first data series include data points 312*a-c* and 360. The data points 312*a-c* and 360 are connected in the graph 300 using a first line. Data in a second data series includes data points 322*a-c* and 360. These data points are connected in the graph using a second line.

Graph 300 includes a number of regions, such as regions 340*a-e*. A region may be bounded by one or more boundaries. For example, region 340*e* is bounded by boundaries 324*a* and 314*a*. Likewise, for example, region 340*b* is bounded by boundaries 324*a* and 314*b*. Note that while boundaries are indicated in graph 300 using lines, boundaries may be indicated in graph 300 in other ways. For example, boundaries may be indicated using arcs, dots, symbols, and/or colors. In addition, boundaries may be associated with boundary identifiers, which may be used to uniquely identify the boundaries. Examples of boundary identifiers include lines, colors, shading, universal identifiers (UIDs), and/or other forms of identifiers that may be used to identify the boundaries.

A location where a boundary meets another boundary may be called a crossover. If a crossover occurs at a data point that is common to the data series, that data point may be called a crossover data point. For example, data point 360 is common to both the first data series and the second data series and occurs at a crossover. Thus, data point 360 is an example of a crossover data point.

A region may represent a normalization with respect to one or more boundaries. The normalization may be used as a scale for the region and may be expressed as a percentage. For example, a region may represent a normalization of a number of boundaries that are above or below a certain boundary. The normalization may be expressed as a percentage that may indicate, for example, a percentage of boundaries that are above the boundary or below the boundary.

In FIG. 3A, region 340*b* may represent a normalization with respect to boundaries 314*b* and 324*a*. This normalization may be expressed as a percentage of boundaries that are below boundary 314*b*. Note that boundaries 314*b* and 324*a* are between time intervals two through five. The total number of boundaries included within these time intervals is two. Since region 340*b* includes the area above boundary 324*a* but below boundary 314*b*, region 340*b* may be said to represent fifty percent of the total boundaries that are below boundary 314*b*.

A percentage associated with a region in a graph may be identified as follows. A point on the x-axis of the graph (x-axis point) may be identified. A total number of boundaries associated with the identified x-axis point may be identified by counting the number of boundaries at an x-axis point. This total may be used as a denominator for identifying the percentage. A numerator may be identified by counting the number of boundaries crossed when following a straight perpendicular line from the x-axis point to a point in the region. The percentage associated with the region may be identified by dividing the numerator by the denominator.

For example, referring again to FIG. 3A, suppose the x-axis point is three and the desired region is region 340*b*. The total number of boundaries at the x-axis point is two. A straight perpendicular line from the x-axis point to region 340*b* crosses only one boundary, i.e., boundary 324*a*. Thus, the number of boundaries crossed to reach region 340*b* from the x-axis is one. The percentage associated with region 340*b* may be identified by dividing one by two, which yields fifty percent. Thus, it may be said that region 340*b* represents fifty percent of the total boundaries at x-axis point three.

Note that in FIG. 3A, the two data series include data points at x-axis points two through eight. Thus, if the x-axis represented time, it may be said that between x-axis points two through eight, the first data series and the second data series share time intervals.

Also, note that the beginning endpoints of the two data series are not coterminous (non-coterminous). In other words, the beginning endpoints of the two data series begin at different x-axis points. Thus, it may be said that the beginning endpoints are non-coterminous. Likewise, note that the ending endpoints are non-coterminous in that the ending endpoints of the two data series end at the different x-axis points.

If endpoints of data series are non-coterminous, certain accommodations may have to be made to account for this situation. For example, in FIG. 3A, the beginning endpoint for the first data series is at x-axis point one and the beginning endpoint for the second data series is at x-axis point two. The total number of boundaries between x-axis point one and x-axis point two is one. On the other hand, between x-axis points two through four, the total number of boundaries is two. If the beginning endpoints for the first data series and the second data series were coterminous, the number of boundaries and number of regions would be the same between x-axis points one through four. However, since the beginning endpoints for the two data series are not coterminous, this situation may be handled, for example, by identifying the total number of boundaries for each x-axis point.

FIG. 3B illustrates graph 350 showing an example of a trend density plot of the data series illustrated in FIG. 3A. A trend density plot may show a density (e.g., of data points) associated with a trend in one or more data series. For example, as will be described further below, a trend density plot may be used to show a density of data points that occur above and/or below a median trend for a plurality of data series.

Referring now to FIG. 3B, various patterns are used to indicate the various regions 340a-e. For example, regions 340a, 340d, and 340e are filled with a slanted-line pattern which, as indicated in legend 380, represents a percentage of boundaries that are below a total number of boundaries for those regions 340a, 340d-e is zero percent. Likewise, for example, regions 340b and 340c are filled with a horizontal-lined pattern which, as indicated in legend 380, represents a percentage of boundaries that are below a total number of boundaries for those regions 340b-c is fifty percent.

Note that in graph 350, region 340b and region 340c are at opposite sides of the crossover data point 360. These regions 340b-c may be said to be a crossover region where the regions 340b-c include a crossover of boundaries. Note that the scale for the regions 340b-c is maintained from region 340b to the region 340c.

Figure 4A:
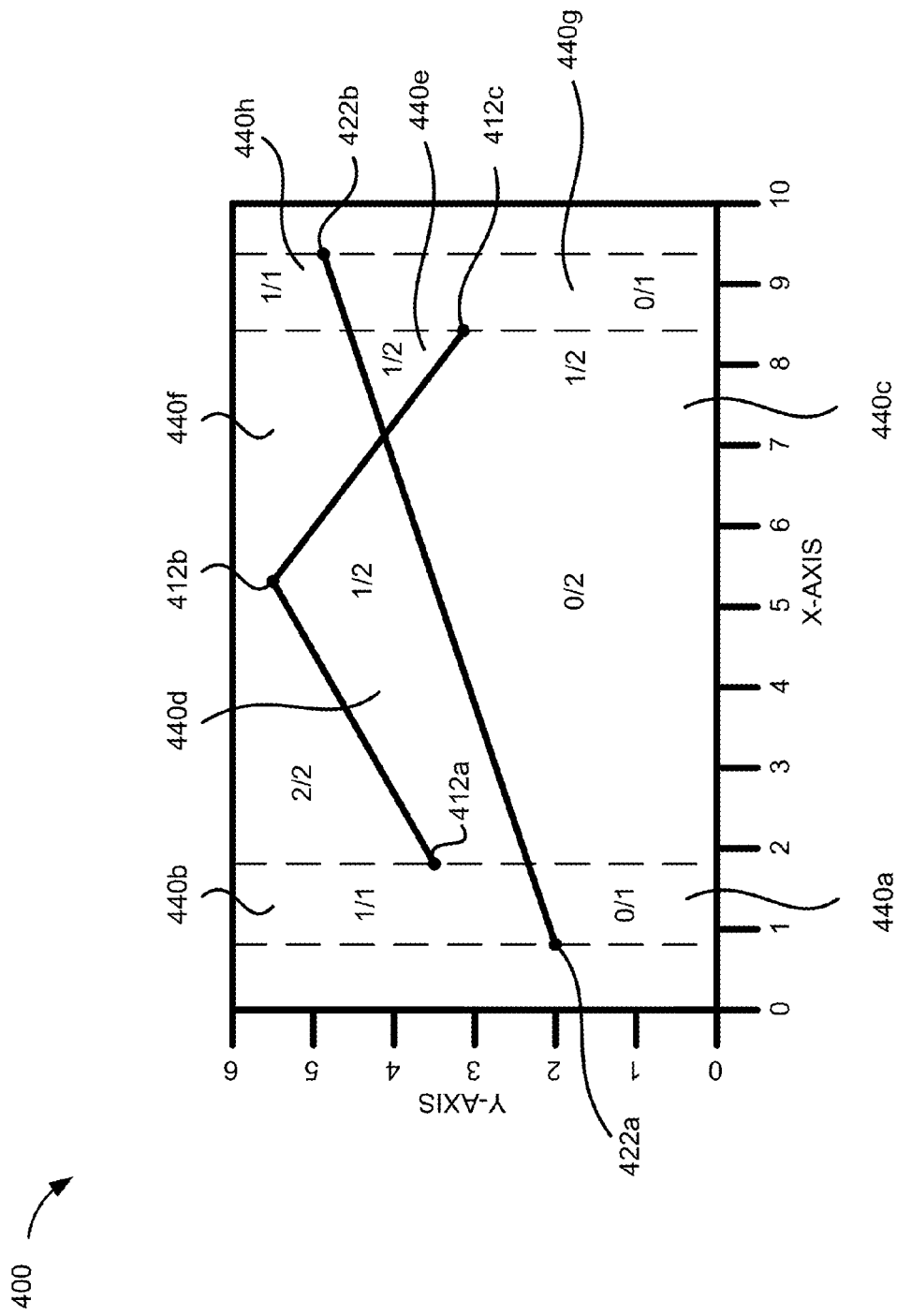
FIGS. 4A-C illustrate example graphs of a first data series and the second data series.
Figure 4B:
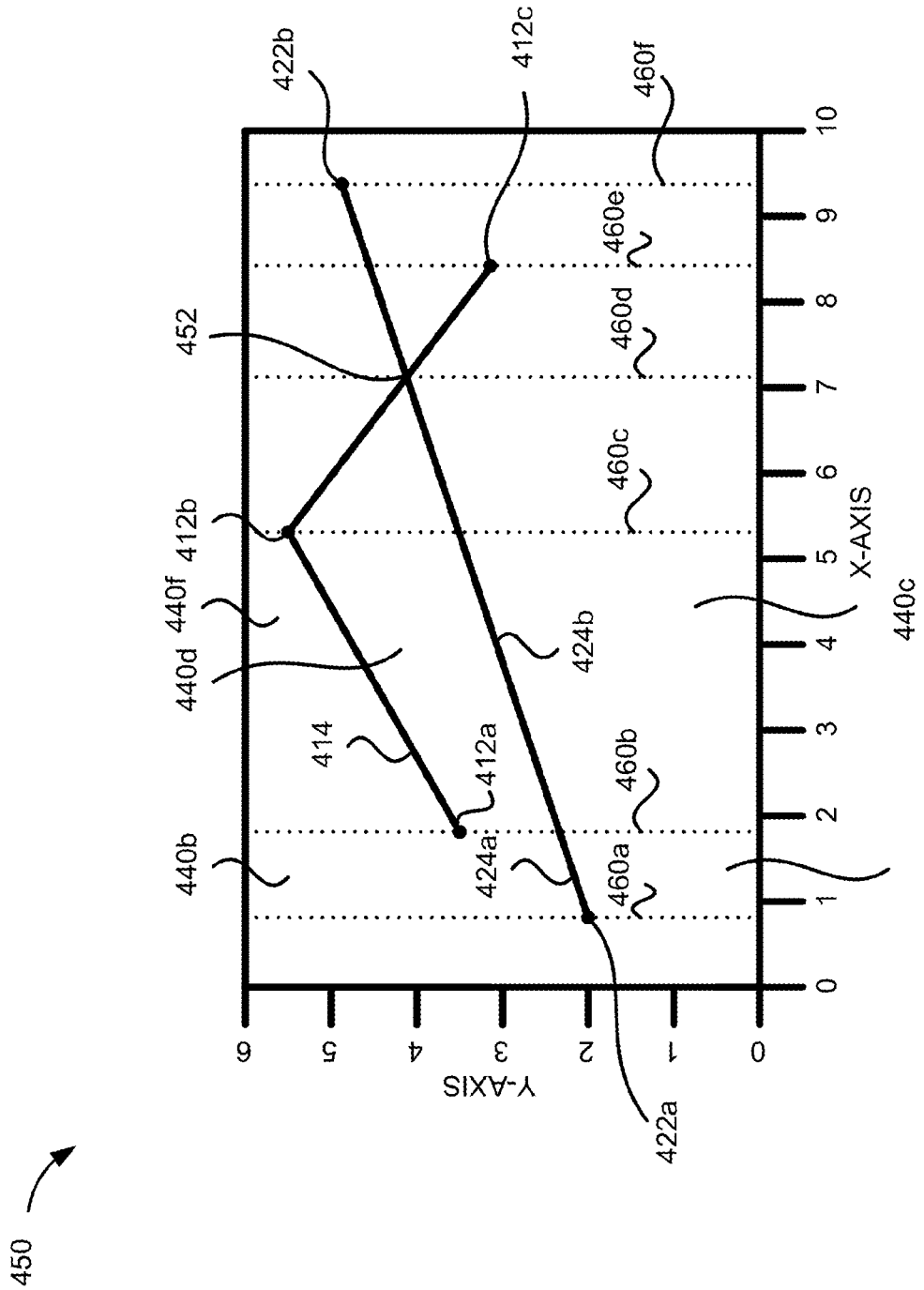
Figure 4C:
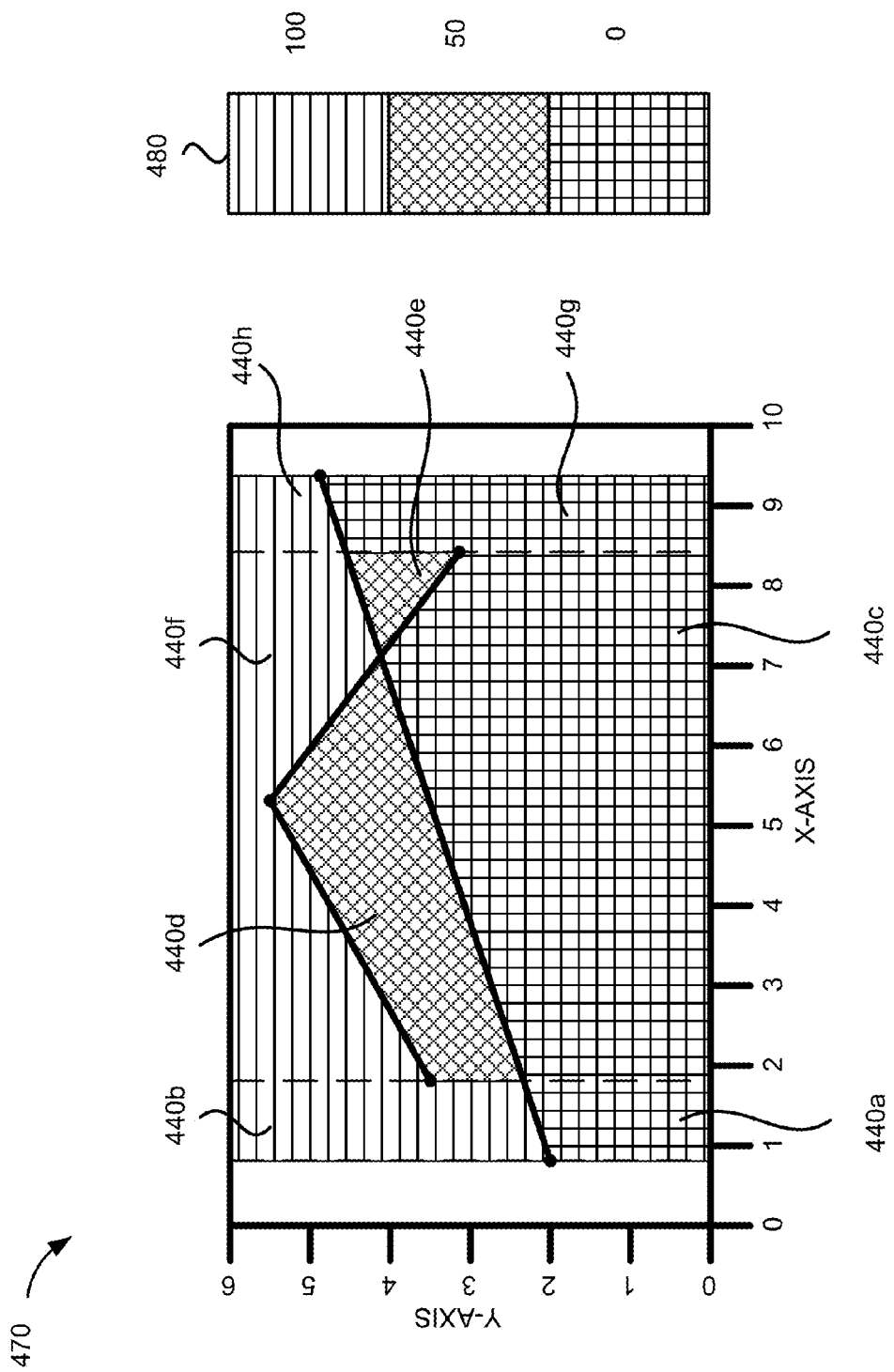

FIGS. 4A-C illustrate an example technique that may be used to generate a trend density plot. Referring to FIG. 4A, graph 400 includes a plot of a first data series and a second data series. The first data series include data points 412a-c and the second data series includes data points 422a-b. Note that the beginning and ending endpoints of the first and second data series are non-coterminous. Also note that data in the first and second data series are sampled at different sample rates. For example, data points 422a and 422b are sampled at a different rate than data points 412a and 412b. Note also that graph 400 and is divided into regions 440a-h.

FIG. 4B illustrates a graph 450 showing various sampling intervals 460a-f that may be used to identify regions 440a-h. Referring to FIG. 4B, sampling intervals 460a-f are indicated in the graph 450 using dotted lines. Sampling intervals 460a-f may be identified based on various points of interest. These points of interest may include, for example, points in the first and/or second data series, and crossovers. For example, sampling interval 460a may be identified based on data point 422a. Likewise, for example, sampling interval 460d may be identified based on crossover 452.

As noted above, sampling intervals 460a-f may be used to identify regions 440a-h. For example, regions 440a-b may be identified using sampling intervals 460a-b. Specifically, suppose line segment 424a, which stretches between sampling intervals 460a-b, represents a boundary. The total number of boundaries between sampling intervals 460a-b is one. A straight perpendicular line from the x-axis, between sampling intervals 460a-b, to a point in region 440a does not cross any boundaries. Thus, region 440a may be said to represent a region of zero percent of the total boundaries are below region 440a. It may also be said that region 440a represents a region where one-hundred percent of the total boundaries are above region 440a. Likewise, a straight perpendicular line from the x-axis, between sample intervals 460a-b, to a point in region 440b crosses the boundary represented by line segment 424a. Since there is only one boundary and that boundary has been crossed to reach the point in region 440b, region 440b may be said to represent a region where one-hundred percent of the total boundaries are below the region 440b. It may also be said that region 440b represents a region where zero percent of the total boundaries are above the region 440b.

This technique may be repeated for other sampling intervals 460 in order to identify other regions 440. For example, suppose line segment 424b represents a first boundary and line segment 414 represents a second (topmost) boundary between sampling intervals 460b-c. The total number of boundaries between the sampling intervals 460b-c is two. A straight perpendicular line from the x-axis between sample intervals 460b-c to a point in region 440c does not cross any boundaries, since the perpendicular line does not cross either line segment 424b or line segment 414 to reach the point in region 440c. Thus, region 440c may be said to represent a region where zero percent of the total boundaries are below the region 440c and 100 percent of the total boundaries are above the region 440c.

Likewise, for example, a straight perpendicular line from the x-axis, between sample intervals 460b-c, to a point in region 440d crosses a single boundary (i.e., boundary represented by line segment 424b). As noted above, a percentage represented by a region may be identified by dividing the number of boundaries crossed by the total number of boundaries. In this example, the total number of boundaries is two and the number of lines crossed is one, thus, the percentage represented by region 440d may be identified by dividing one by two. In this example, the percentage is fifty percent. Thus, it may be said that region 440d represents a region where fifty percent of the total boundaries are below the region 440d and fifty percent of the total boundaries are above the region 440d.

Further, a straight perpendicular line from the x-axis between sample intervals 460b-c to a point in region 440f crosses two boundaries represented by line segments 424b and 414. The percentage represented by region 440f may be identified by dividing the number of boundaries crossed (i.e., two) by the total number of boundaries (i.e., two). In this example, the percentage is one-hundred percent. Thus, it may be said that region 440f represents a region where one-hundred percent of the boundaries are below the region 440f.

FIG. 4C illustrates a graph 470 showing an example of a trend density plot of the first and second data series illustrated in FIG. 4A. Referring to FIG. 4C, the trend density plot includes regions 440a-h, which may be identified using techniques described above. As indicated in legend 480, a region 440 where zero percent of the total boundaries are below the region 440 is indicated using a checkerboard pattern. Likewise, a region 440 where fifty percent of the total boundaries are below the region 440 is indicated using a crosshatch pattern. In addition, a region 440 where one-hundred percent of the total boundaries are below the region 440 is indicated using a horizontal line pattern.

Figure 5:
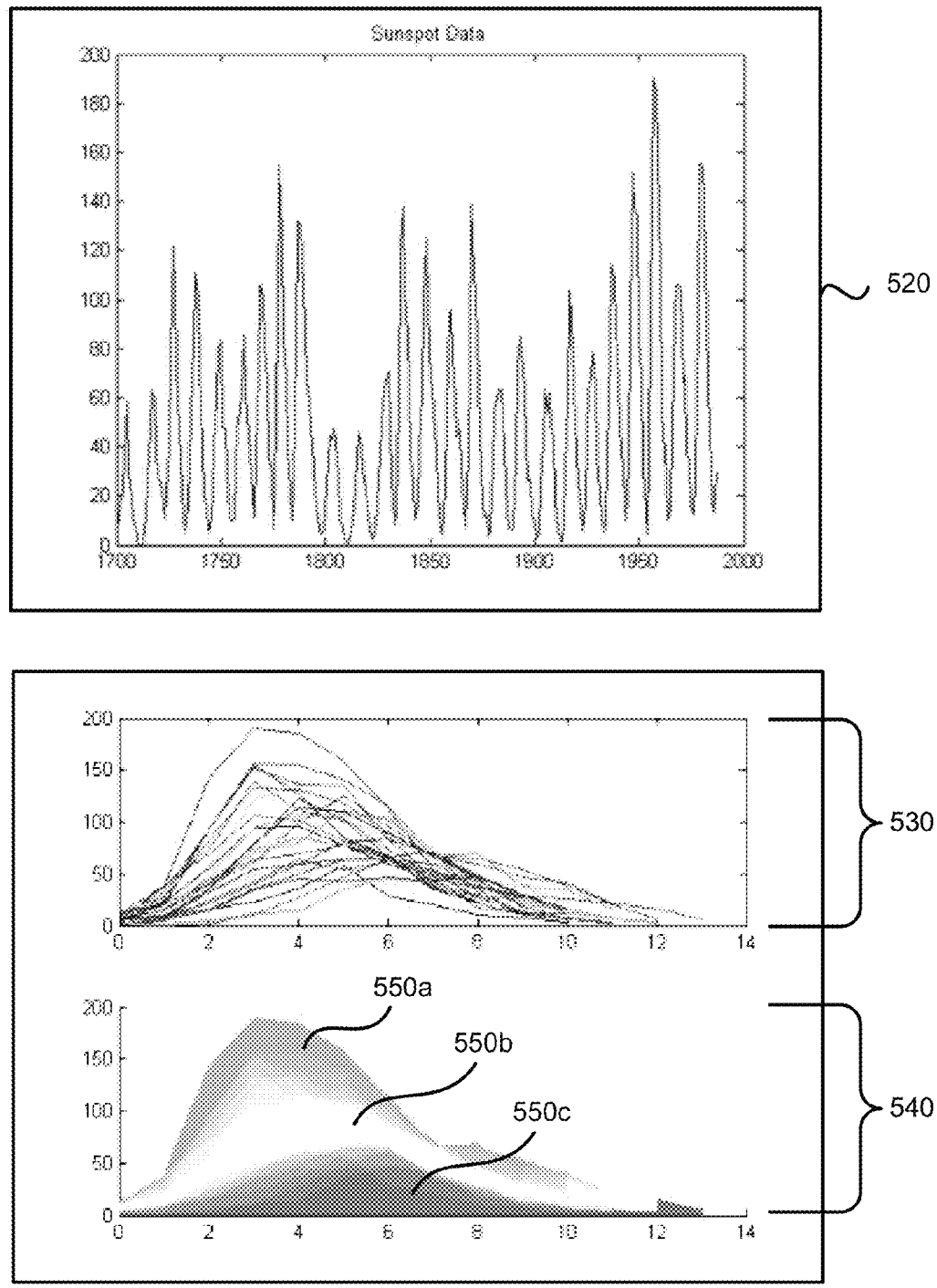
FIG. 5 illustrates example graphs of a plurality of data series that include cyclic data.

FIG. 5 illustrates example graphs of a plurality of data series that include cyclic data. Referring to FIG. 5, a graph 520 of sunspot data is shown for a period ranging from the year 1700 to the year 1990. As can be seen in graph 520, the data is cyclic where a cycle is approximately 14 years in length.

Graph 530 illustrates the number of sunspots for the various cycles over the 14-year cycles. As can be seen in graph 530, it may be difficult to spot trends from the data depicted in graph 530. For example, utilizing graph 530 it may be difficult to readily discern how often a particular sunspot number for a particular year occurs in the 14-year cycle. Moreover, utilizing graph 530 it may be difficult to readily discern a trend of average sunspots for a range of years within the 14-year cycle.

For example, using graph 530, it may be difficult to identify the average number of sunspots between years two and eight within the 14-year cycle.

Graph 540 includes a trend density plot of the data series illustrated in graph 530. As can be seen in the trend density plot, three distinct regions 550a-c may emerge from the data. Region 550a may indicate a density of sunspots that occur above a median number of sunspots reflected in the data. Region 550b may indicate a density of sunspots that occur at a median number of sunspots reflected in the data. Region 550c may indicate a density of sunspots that occur below a median number of sunspots reflected in the data. Also, in the trend density plot, it may be easier to discern an average number of sunspots that may occur, for example, between the years two and eight within the 14-year cycle.

The trend density plot in graph 540 may be generated using techniques described above. For example, the sunspot data illustrated in graph 520 may be acquired (e.g., read, received). The acquired sunspot data may be processed to reflect individual 14-year cycles (such as illustrated in graph 530). Boundaries may be established based on data contained in the 14-year cycles. Regions may be identified such as described above (e.g., using sampling intervals). The regions may reflect a normalization of the data contained in the 14-year cycles. The regions may be shaded to reflect the normalization. For example, the normalization may be expressed as a percentage of an occurrence of a sunspot number and the shading may reflect this percentage.

Figure 6:
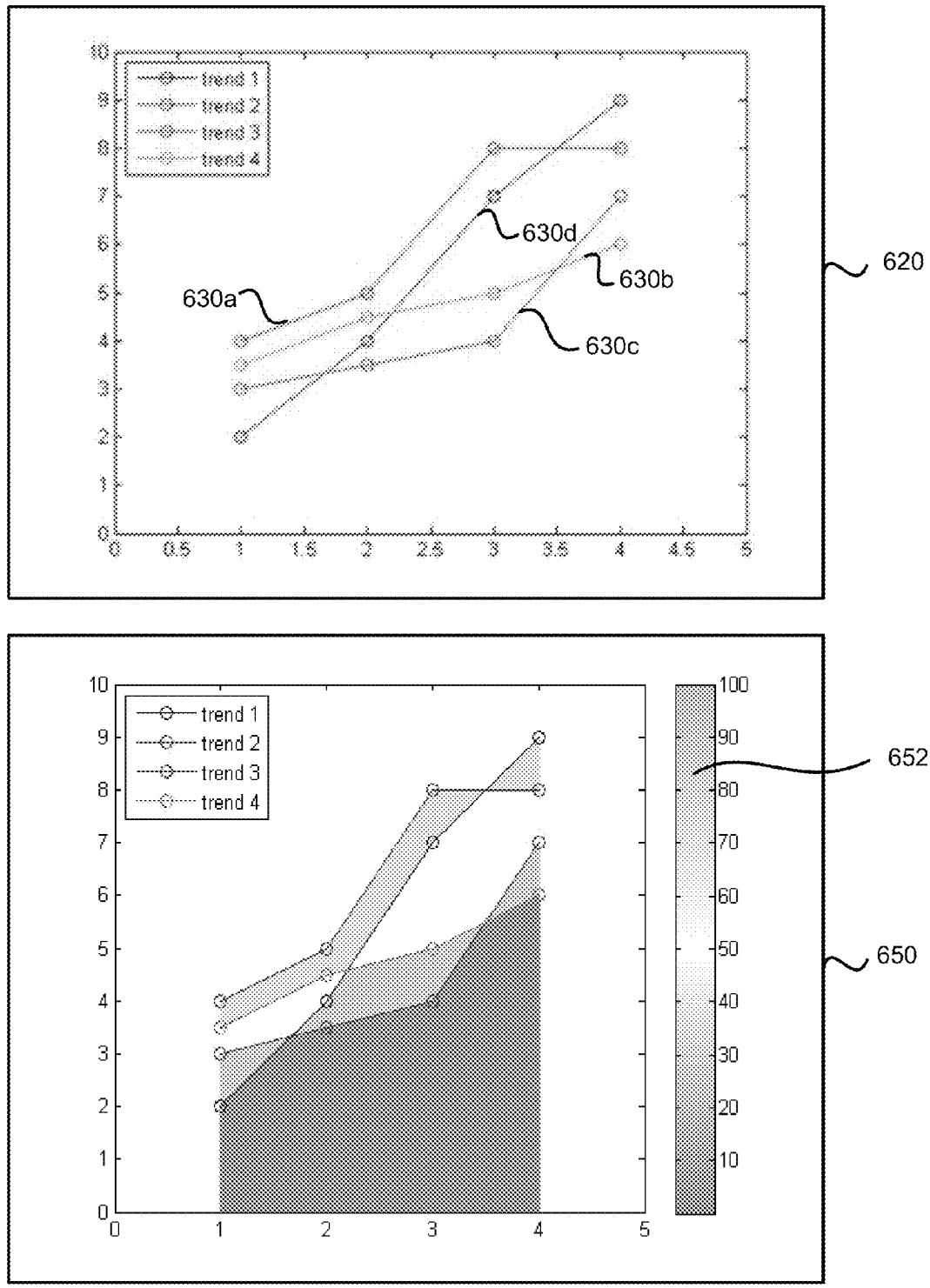
FIG. 6 illustrates example graphs of a plurality of data series that are coterminous.

FIG. 6 illustrates graphs of another plurality of data series. Referring to FIG. 6, graph 620 illustrates four data series named "trend 1", "trend 2", "trend 3", and "trend 4". Note that the beginning and ending endpoints for the four data series are coterminous. That is, the beginning endpoints for the four data series begin at the same x-axis point (i.e., one). Likewise, the ending endpoints for the four data series end at the same x-axis point (i.e., four).

Graph 650 illustrates an example of a trend density plot of the data series illustrated in graph 620. The trend density plot in graph 650 may include various regions that may indicate, for example, percentages of boundaries that are below certain boundaries, such as described above.

Legend 652 may indicate a color that may be used in the graph 650 to indicate a particular identified percentage of boundaries that fall below an upper (e.g., topmost boundary). For example, a first color (e.g., salmon) may be used to indicate that twenty-five percent of the boundaries fall below the upper boundary. Likewise, for example, a second color (e.g., pink) may be used to indicate that fifty percent of the boundaries below the upper boundary. In addition, a third color (e.g., white) and a fourth color (e.g., green) may be used to indicate that seventy-five percent and one-hundred percent of the boundaries fall below the upper boundary.

Figure 7A:
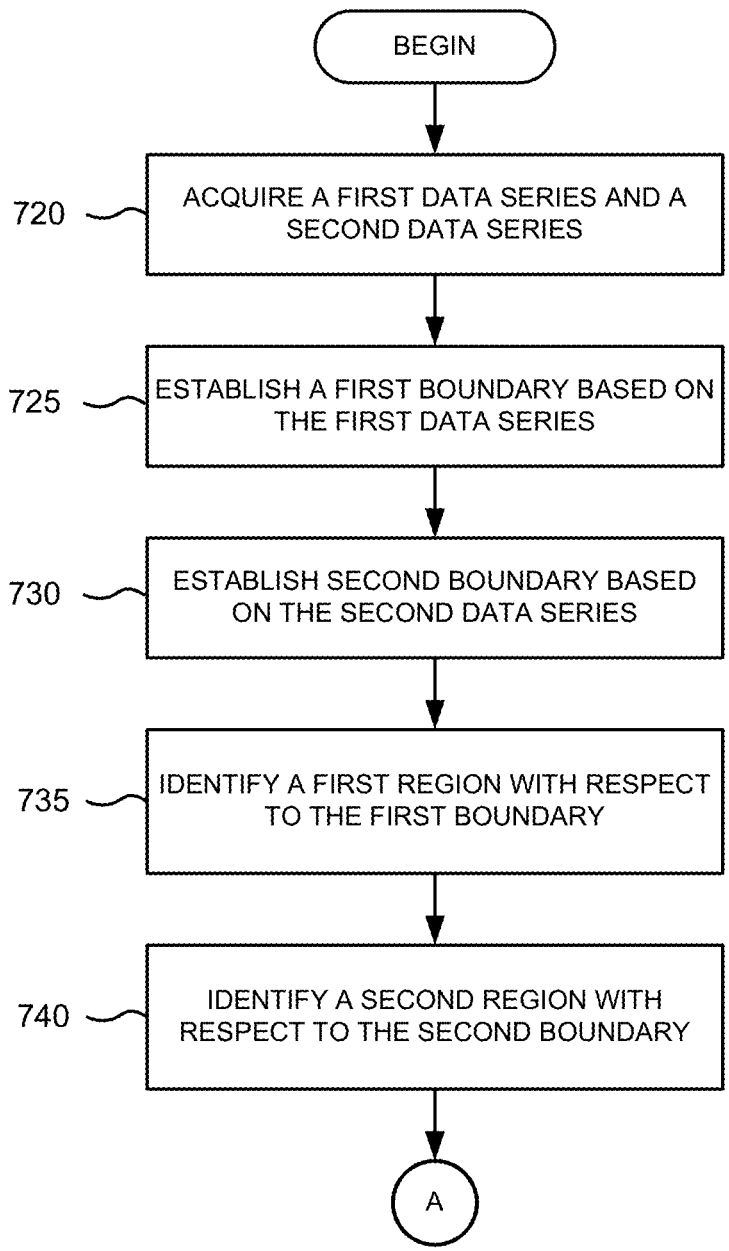
FIGS. 7A-B illustrates a flowchart of example acts that may be used to render a depiction of a first data series and a second data series.
Figure 7B:
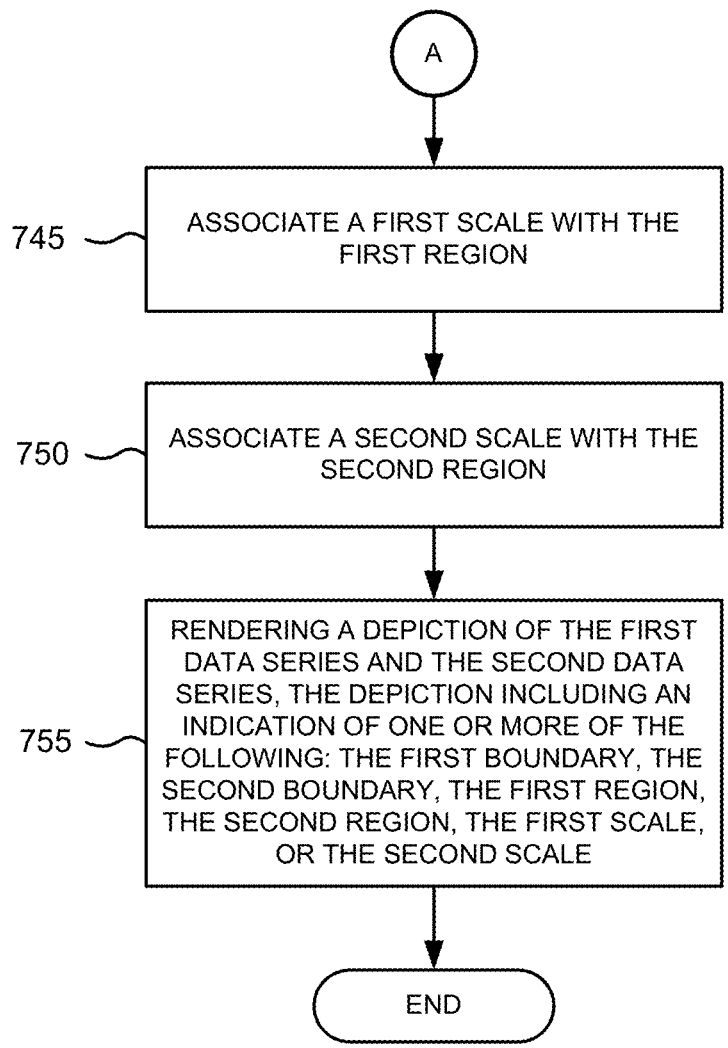

FIGS. 7A-B illustrate a flowchart of example acts that may be used to render a trend density plot of a first data series and a second data series in accordance with an embodiment of the invention. Referring to FIG. 7A, at block 720 the first data series and the second data series are acquired. The data series may be acquired, for example, from an input device (e.g., input device 160), from storage (e.g., secondary storage 150), via a communication network, or otherwise acquired.

At block 725, a first boundary is established (e.g., identified) based on the first data series. For example, the first boundary may be a first line that connects various data points contained in the first data series, such as described above. At block 730, a second boundary is established based on the second data series. The second boundary may include a second line that connects various data points contained in the second data series, such as described above.

At block 735, a first region, with respect to the first boundary and a total number of boundaries, is identified. The first region may be identified, for example, based on a percentage of boundaries that are above or below the first boundary, such as described above. At block 740, a second region, with respect to the second boundary, is identified. The second region may be identified, for example, based on a percentage of boundaries that are above or below the second boundary.

At block 745 (FIG. 7B), a first scale is associated with the first region. The first scale may represent a relationship between the first boundary and one or more other boundaries. For example, the first scale may represent a percentage of boundaries that are above or below the first boundary. At block 750, a second scale is associated with the second region. The second scale may represent a relationship between the second boundary and one or more other boundaries. For example, the second scale may represent a percentage of boundaries that are above or below the second boundary.

At block 755 a depiction of the first data series and the second data series is rendered. The depiction may include a trend density plot that may show an indication of one or more of: the first boundary, the second boundary, the first region, second region, the first scale, or the second scale. The depiction may be rendered on an output device, such as output device 170. The depiction may be rendered as, for example, a display, a printing, a projection, or some other rendering. The depiction may include a plot surface. The plot surface may have a plurality of axes (e.g., an x-axis, y-axis, a z-axis).

The following describes an example of how the above acts may be applied. Referring to FIGS. 1, 2, 3A-B, and 7A-B, suppose, for example, that a first data series includes data points 312a-c and 360. In addition, suppose that a second data series includes points 322a-c and 360. TCE 200 may acquire the first data series (block 720) and the second data series (block 725). For example, the data series may be contained in a file that may be stored on secondary storage 150. TCE 200 may acquire the data series by reading the data series from the file. Note that the first and/or second data series may be acquired by TCE 200 in other ways, such as, for example, via an input device 160 (e.g., a keyboard) and/or from a communications network via a network interface 180.

The TCE 200 may establish a first boundary based on the first data series (block 725) and a second boundary based on the second data series (block 730). For example, boundary 324a may be established based on data points 322a and 360. Likewise, for example, boundary 314b may be established based on data points 312b and 360.

TCE 200 may identify a first region with respect to the established first boundary (block 735). For example, suppose boundary 324a is the first boundary and region 340e is the first region. TCE 200 may identify the portion of region 340e under boundary 324a with respect to boundary 324a, for example, as described above. TCE 200 may treat that portion of region 340e as a region that represents a percentage of a total number of boundaries that are below boundary 324a, such as described above.

Likewise, TCE 200 may identify a second region with respect to the established second boundary (block 740). For example, suppose boundary 314b is the second boundary and region 340b is the second region. TCE 200 may identify region 340b with respect to boundary 314b, for example, as described above. TCE 200 may treat region 340b as a region that represents a percentage of total boundaries that are below boundary 314b, such as described above.

TCE 200 may associate a first scale with the first region (block 745). For example, suppose the first region is region 340e, TCE 200 may identify the percentage that region 340e represents by identifying a total number of boundaries at an x-axis point within region 340e and a number of boundaries crossed at that x-axis point to reach a point in region 340e and dividing the number of boundaries crossed by the total number of boundaries, as described above. The identified percentage may be a first scale that TCE 200 may associate with region 340e. Likewise, suppose the second region is region 340b. TCE 200 may similarly associate a second scale (e.g., a percentage) with the region 340b (block 750), as described above.

TCE 200 may depict the first data series and the second data series on an output device 170 (block 755). The depiction may include, for example, an indication of the first boundary, the second boundary, the first region, the second region, the first scale, and the second scale. For example, the depicted first and second data series may include data points that make up the series. The data points may be presented in the depiction using dots. The first and second boundaries may be depicted using lines. The first and second regions may be depicted using, for example, patterns (such as shown in FIG. 3B), colors, or other techniques to indicate the regions in the depiction.

Figure 8:
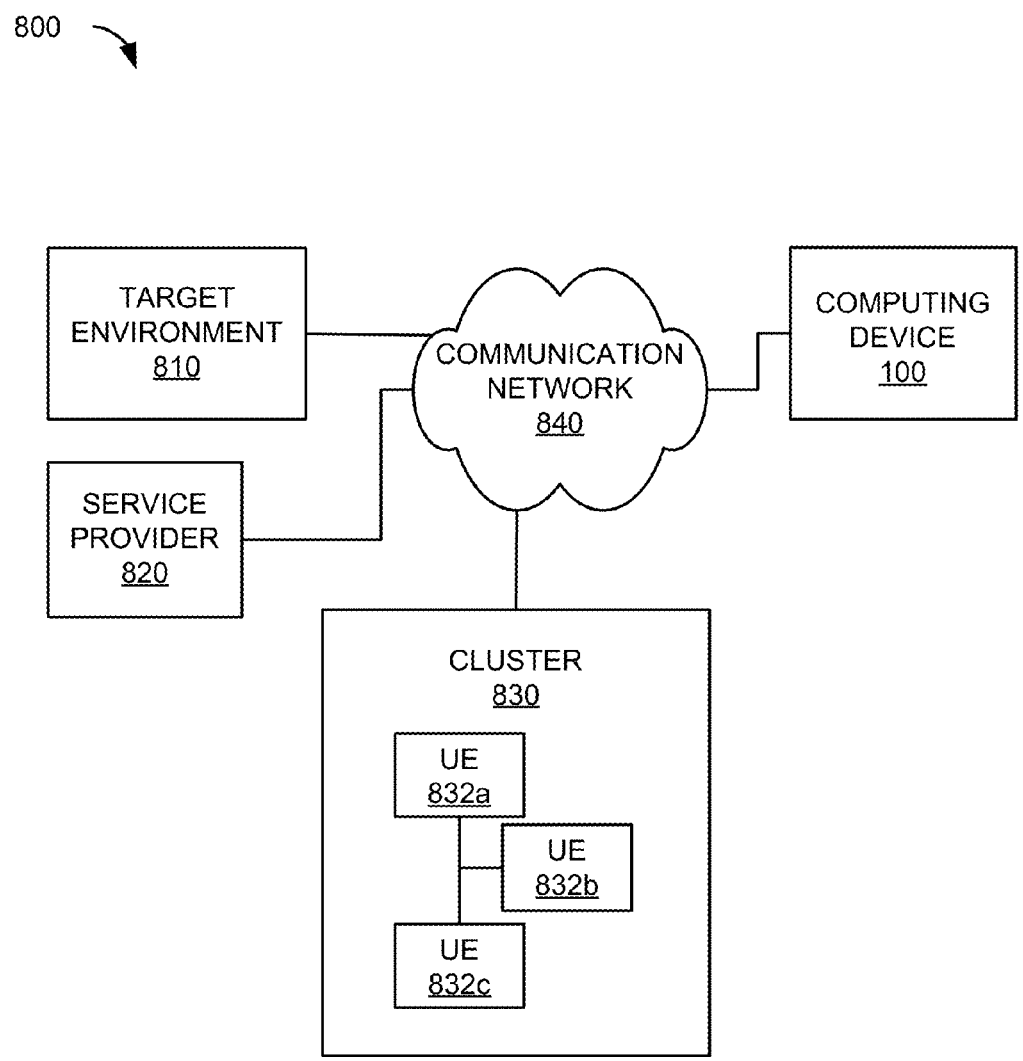
FIG. 8 illustrates an example of a distributed system that may implement one or more embodiments of the invention.

One or more embodiments of the invention may be implemented in a distributed environment. FIG. 8 illustrates an example of a distributed environment 800 that may implement one or more embodiments of the invention. Referring to FIG. 8, environment 800 may contain various components including computing device 100, target environment 810, service provider 820, cluster 830, and communication network 840. Note that the distributed environment 800 is just one example of a distributed environment that may be used with one or more embodiments of the invention. Other distributed environments that may be used with one or more embodiments of the invention may contain more components or fewer components than illustrated in FIG. 8. Moreover, the components in the distributed environments may be arranged differently than the arrangement shown in FIG. 8. In addition, the distributed environments may implement various "cloud computing" frameworks.

Details of computing device 100 were described above with respect to FIG. 1. In distributed environment 800, computing device 100 may, among other things, exchange information (e.g., data) with other components in the communication network 840 (e.g., target environment 810, service provider 820, and cluster 830). Computing device 100 may interface with the communications network 840 via a communication interface 180.

Target environment 810 may interpret and/or execute, for example, one or more embodiments of the invention, which may be generated in or otherwise made available to the distributed environment 800. The communication network 840 may include digital and/or analog aspects. Information exchanged in communication network 840 may include machine-readable information having a format that may be used, for example, in the communication network 840 and/or with one or more components in the communication network 840.

For example, the information may be encapsulated in one or more packets that may be used to transfer the information through the communication network 840. Information may be exchanged between components in the communication network 840 using various communication protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, or other communication protocol.

The communication network 840 may comprise various network devices, such as gateways, routers, switches, firewalls, servers, repeaters, address translators, etc. Portions of the communication network 840 may be wired (e.g., using wired conductors, optical fibers) and/or wireless (e.g., using free-space optical (FSO), radio frequency (RF), acoustic transmission paths). Portions of the communication network 840 may include a substantially open public network, such as the Internet. Portions of the communication network 840 may include a more restricted network, such as a private corporate network or virtual private network (VPN). It should be noted that implementations of communication networks and/or devices operating on communication networks described herein are not limited with regards to, for example, information carried by the communication networks, protocols used in the communication networks, and/or the architecture/configuration of the communication networks.

Cluster 830 may include a number of units of execution (UEs) 832a-c that may execute or interpret one or more embodiments of the invention or portions thereof on behalf of computing device 100 and/or another component, such as service provider 820. The UEs 832a-c may reside on a single device or chip or on multiple devices or chips. For example, the UEs 832a-c may be implemented in a single ASIC or in multiple ASICs. Likewise, the UEs 832a-c may be implemented in a single computer system or multiple computer systems. Other examples of UEs 832a-c may include, for example, some combination of FPGAs, CPLDs, ASIPs, processors, multiprocessor systems-on-chip (MPSoCs), graphic processing units, and/or microprocessors. The UEs 832a-c may perform operations on behalf of another component in the distributed environment 800. For example, in an embodiment, the UEs 832a-c may execute portions of code associated with the TCE 200. Here, TCE 200 may dispatch certain activities pertaining to one or more embodiments of the invention to the UEs 832a-c for execution. The service provider 820 may configure cluster 830 to provide, for example, the above-described services to computing device 100 on a subscription basis (e.g., via a web service).

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to FIGS. 7A-B, the order of the acts may be modified in other implementations. Further, non-dependent acts may be performed in parallel. Also, the term "user", as used herein, is intended to be broadly interpreted to include, for example, a computing device (e.g., a workstation) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, embodiments of the invention may be stored in one or more tangible computer-readable storage media and may include computer-executable instructions that may be executed by processing logic, such as processing logic 120. The computer-executable instructions may include instructions that implement one or more embodiments of the invention. The tangible computer-readable storage media may be volatile or non-volatile and may include, for example, flash memories, dynamic memories, memristor memories, removable disks, and non-removable disks. No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. One or more non-transitory computer-readable storage media storing instructions, the instructions comprising:
    a plurality of instructions which, when executed by one or more processors, cause the one or more processors to:
    establish a first boundary based on a first data series;
    establish a second boundary based on a second data series,
        the second boundary being different than the first boundary;
    identify a first region with respect to the first boundary;
    identify a second region with respect to the second boundary,
        the second region being different than the first region;
    associate a first scale with the first region,
        the first scale representing a percentage of boundaries below the first boundary;
    associate a second scale with the second region,
        the second scale representing a percentage of boundaries below the second boundary; and
    render a depiction of the first data series and the second data series on an output device,
        the depiction including:
            an indication of the first region,
            an indication of the second region,
            an indication of the first scale,
            an indication of the second scale, and
            a legend indicating:
                a first value, for the first scale, that represents the percentage of boundaries below the first boundary, and
                a second value, for the second scale, that represents the percentage of boundaries below the second boundary.

2. The one or more non-transitory computer-readable media of claim 1, where the first scale or the second scale is depicted using a color or pattern.

3. The one or more non-transitory computer-readable media of claim 1, where the first scale is depicted using a color, and
    where the color varies in intensity based on a percentage associated with the first scale.

4. The one or more non-transitory computer-readable media of claim 1, the instructions further comprising:
    one or more instructions to depict boundaries using identifiers,
        the depicted boundaries including the first boundary and the second boundary.

5. The one or more non-transitory computer-readable media of claim 4, where the identifiers include lines.

6. The one or more non-transitory computer-readable media of claim 1, where the first data series and the second data series share time intervals.

7. The one or more non-transitory computer-readable media of claim 1, where the first data series and the second data series are coterminous.

8. The one or more non-transitory computer-readable media of claim 1, the instructions further comprising:
    one or more instructions to identify a crossover associated with two of a set of particular boundaries,
        the set of particular boundaries including two or more of the first boundary, the second boundary, one or more boundaries below the first boundary, or one or more boundaries below the second boundary.

9. The one or more non-transitory computer-readable media of claim 8, where the crossover occurs at a crossover point.

10. The one or more non-transitory computer-readable media of claim 8, the instructions further comprising:
    one or more instructions to maintain the first scale for a crossover region between the second boundary and the first boundary.

11. The one or more non-transitory computer-readable media of claim 1, where the first boundary has a sample rate that differs from a sample rate for the second boundary.

12. The one or more non-transitory computer-readable media of claim 1, where the first data series has an endpoint that is not coterminous with an endpoint for the second data series.

13. The one or more non-transitory computer-readable media of claim 12, the instructions further comprising:
    one or more instructions to accommodate the first data series having an endpoint that is not coterminous with an endpoint for the second data series.

14. The one or more non-transitory computer-readable media of claim 1, the instructions further comprising:
    one or more instructions to acquire at least one of the first data series or the second data series.

15. A method comprising:
    establishing:
        a first boundary based on a first data series, and
        a second boundary based on a second data series,
        the establishing being performed by a computing device;
    identifying:
        a first region with respect to the first boundary, and
        a second region with respect to the second boundary,
        the identifying being performed by the computing device;
    associating a first scale with the first region,
        the first scale representing a percentage of boundaries below the first boundary, and
        the associating the first scale being performed by the computing device;
    associating a second scale with the second region,
        the second scale representing a percentage of the boundaries below the second boundary, and
        the associating the second scale being performed by the computing device; and
    rendering a depiction of the first data series and the second data series on an output device,
        the depiction including:
            an indication of the first region, an indication of the second region,
an indication of the first scale,
an indication of the second scale, and
a legend indicating:
a first value, for the first scale, that represents the percentage of boundaries below the first boundary, and
a second value, for the second scale, that represents the percentage of boundaries below the second boundary, the rendering being performed by the computing device.

16. The method of claim 15, where the first scale or the second scale is depicted using a color or pattern.

17. The method of claim 15, wherein where the first scale is depicted using a color, and
where the color varies in intensity based on a percentage associated with the first scale.

18. The method of claim 15, further comprising:
rendering an indication of the first boundary or the second boundary, in the depiction, as a line.

19. The method of claim 15, where the first data series has an endpoint that is not coterminous with an endpoint of the second data series, and
where the method further comprises:
accommodating the first data series having an endpoint that is not coterminous with an endpoint of the second data series.

20. A device comprising:
a memory to store instructions; and
one or more processors to execute the instructions to:
establish:
a first boundary based on a first data series, and
a second boundary based on a second data series;
identify:
a first region with respect to the first boundary, and
a second region with respect to the second boundary;
associate a first scale with the first region,
the first scale being identified based on the first boundary and a total number of boundaries;
associate a second scale with the second region,
the second scale being identified based on the second boundary and the total number of boundaries; and
render a depiction of the first data series and the second data series on an output device,
the depiction including:
an indication of the first region,
an indication of the second region,
an indication of the first scale,
an indication of the second scale, and
a legend indicating:
a first value for the first scale,
the first value being based on the first boundary and the total number of boundaries, and
a second value for the second scale,
the second value being based on the second boundary and the total number of boundaries.

\* \* \* \* \*

UNITED STATES PATENT AND TRADEMARK OFFICE
CERTIFICATE OF CORRECTION

PATENT NO.        : 8,605,109 B1
APPLICATION NO.   : 13/294710
DATED             : December 10, 2013
INVENTOR(S)       : Edward W. Gulley Page 1 of 1

It is certified that error appears in the above-identified patent and that said Letters Patent is hereby corrected as shown below:

In the Claims

Please correct Claim 17 (Column 17, Line 14) to read as follows:

The method of claim 15, where the first scale

Signed and Sealed this
Second Day of September, 2014

Michelle K. Lee
*Deputy Director of the United States Patent and Trademark Office*